United States Patent [19]
Seki et al.

[11] Patent Number: 6,058,270
[45] Date of Patent: May 2, 2000

[54] PHOTOMETRIC DEVICE AND CAMERA HAVING THE PHOTOMETRIC DEVICE

[75] Inventors: Yoichi Seki; Hajime Oda, both of Yotsukaido, Japan

[73] Assignee: Seiko Precision Inc., Japan

[21] Appl. No.: 09/270,317

[22] Filed: Mar. 16, 1999

[30] Foreign Application Priority Data

Mar. 16, 1998 [JP] Japan .................................. 10-065407

[51] Int. Cl.$^7$ .............................. G03B 15/03; G03B 7/26; H01J 40/14; G01J 1/42
[52] U.S. Cl. .......................... 396/165; 396/176; 396/205; 250/214 P; 356/218
[58] Field of Search ..................................... 396/287, 281, 396/6, 165, 205, 206, 201, 202, 176, 240, 213, 295, 289; 250/214 P; 356/218, 226, 227

[56] References Cited

U.S. PATENT DOCUMENTS 3,792,648  2/1974  Ishiguro .................................. 396/289
4,472,042  9/1984  Iwata et al. ............................ 396/165

*Primary Examiner*—W. B. Perkey
*Attorney, Agent, or Firm*—Adams & Wilks

[57] ABSTRACT

A low cost, low power photometric circuit suitable for use in a low end camera includes a first counter for counting successive pulses produced by a first oscillator having a substantially constant oscillation frequency and a second counter for counting successive pulses produced by a second oscillator having an oscillation frequency which varies in accordance with ambient brightness. The ambient brightness is judged according to outputs of the counters so that even if the oscillation frequency of the second oscillator varies only slightly due to a change in ambient brightness, the slight variation is easily detectable as an accumulated count value. Accordingly, costly, high-precision components are not needed. The low cost photometric circuit requires no microcomputer, analog/digital converter or comparator and can be fabricated in a single integrated circuit operated at a low voltage of 1V or less, and is thus suitable for incorporation into a low end camera.

11 Claims, 10 Drawing Sheets

PHOTOMETRIC DEVICE AND CAMERA HAVING THE PHOTOMETRIC DEVICE

FIELD OF THE INVENTION

The present invention relates to a photometric device and, in particular, to a simplified, low-cost photometric device capable of operation at a low voltage, and to a camera incorporating the photometric device.

BACKGROUND DISCUSSION

A low-cost camera which has become popular in recent years is commonly referred to as a "disposable camera" or a "film with a lens" since it contains little more than a plastic housing, a plastic lens, film and a shutter mechanism. This type of camera is designed generally for taking snapshots, and will be referred to herein as a "low-end" camera. Some commercially available low-end cameras have a built in flash unit, or stroboscope, to enable the taking of pictures in low light conditions, such as indoors. However, low-end cameras are not usually provided with means for detecting the ambient brightness and determining whether operation of the flash unit is needed. As a result, operation of the built in stroboscope provided in low-end cameras is performed manually. In the typical low-end camera provided with a stroboscope, charging of the stroboscope is commenced by the pushing of a stroboscope charging switch disposed on the camera body separately from the shutter release button.

In the above-described low-end camera, the decision as to whether or not the stroboscope will be operated depends entirely upon the photographer's judgment. An inexperienced photographer may thus take an underexposed photograph by failing to operate the stroboscope in low light conditions or may overexpose the film and waste power by unnecessarily operating the stroboscope when ambient brightness is high.

To satisfy the requirements of low cost and small space and weight, the low-end camera is required to reliably perform the aforesaid functions with a low voltage, low capacity power supply, such as a single low capacity dry cell (typically a 1.5V battery).

Cameras which are more expensive than the typical low-end camera described above are often equipped with an internal photometric circuit for judging ambient brightness and determining whether operation of a stroboscope is necessary. The typical brightness judging circuit is constructed using the combination of an internal microcomputer provided in the camera for performing various functions and an analog/digital converter or a comparator for detecting brightness. However, the power supply for a microcomputer must generally be at least as high as about 3V, and that for a comparator must be at least as high as about 2V, even if it is fabricated using low power bipolar processing techniques. Moreover, a microcomputer and comparator are expensive components and are not suitable for use in a low-end camera. These components are also high in current consumption so that a dry cell or a low capacity power supply will be rapidly consumed. This makes it difficult for a power supply consisting of a single low voltage dry cell of low capacity to drive such components as the cell may be temporarily lowered to about 1V by a load even when sufficient voltage remains in the battery to operate other circuits.

Moreover, in order to compensate for fluctuations in device characteristics due to temperature and supply voltage variations, brightness judging circuitry generally uses compensation data stored in external memory such as EEPROM (Electric Erasable Programmable Read Only Memory) or an additional temperature compensation circuit. Thus, the construction of brightness judging circuitry is even more expensive and larger than noted above. As a result, conventional photometric circuitry of the type commonly used in more expensive cameras is not well suited for use in low-end cameras.

In order to solve the foregoing problems, the assignee of the present application has proposed, in its co-pending Japanese Patent Application No. 9-357204, a low cost, low power photometric circuit and a stroboscope driving circuit which are particularly well-suited for use in a low-end camera by fabricating the major components of the photometric circuit in one integrated circuit and by adding a peripheral circuit.

However, when the aforementioned circuit uses as a light detector an inexpensive Cadmium Sulfide cell ("CdS") having poor response characteristics so as to maintain low cost, it is necessary to reduce the frequency of an oscillator used in the circuit and to enlarge a capacitor connected to the oscillator. This makes it difficult to mount the capacitor along with the remainder of the photometric circuit in a single integrated circuit chip and requires that a capacitor having a large capacitance value be mounted externally to the circuit. It is also necessary to connect an externally mounted variable resistor. The use of these external components increases the size and cost of the photometric circuit, and the camera, and hence, these external components are not preferable in a small-sized, low-end camera.

SUMMARY OF THE INVENTION

In view of the foregoing shortcomings of the prior art, an object of the present invention is to provide a low-cost, low power photometric circuit which is well suited, for example, for use in all types of cameras, including a low-end camera.

In order to achieve the foregoing object and others which will be readily apparent to those of ordinary skill in the art, a photometric circuit according to the present invention is provided with brightness deciding means which judges ambient brightness in accordance with the outputs of first counting means which counts an output of a first oscillator and second counting means which counts an output of a second oscillator, the second oscillator having an oscillation frequency which varies according to an ambient brightness. By this construction, the cost and current consumption of the photometric circuit can be made lower than that of the prior art, and a photometric circuit can be incorporated into a device without the need for a microcomputer or comparator. Since the ambient brightness is judged not according to the outputs from individual oscillators but according to the outputs of individual counting means which count the outputs of the oscillators, even if the second oscillator undergoes only a slight change in oscillation frequency in accordance with the ambient brightness, this slight difference can easily be detected since it results in a count value which is accumulated by the counting means. Thus, ambient brightness can be reliably judged on the basis of the accumulated count outputs. This makes it unnecessary to use costly, large-sized, high-precision components in the second oscillator.

Preferably, the ambient brightness is judged on the basis of a phase difference between the outputs of the first and second counting means so that effects similar to the aforementioned ones can be achieved.

The first and second oscillators, the first and second counting means and the brightness deciding means are preferably formed in a single integrated circuit chip by CMOS (Complementary Metal Oxide Semiconductor) processing techniques so that the photometric device can be operated at a voltage of 1V or less. If the inventive photometric device is incorporated into a low-end camera or the like, reliable operation can be obtained even with a low voltage, low capacity power supply such as a single 1.5V dry cell.

Preferably, the first and second oscillators are made symmetric in their circuitry, so that fluctuations in device characteristics due to temperature and supply voltage variations are offset, thereby making it unnecessary to add temperature or supply voltage compensating circuitry as used in the prior art. This effect is enhanced by fabricating the circuitry in a single integrated circuit.

In accordance with the present invention, a camera incorporating the inventive photometric circuit is provided. In a preferred embodiment, the camera is a low-end camera comprising the inventive photometric circuit, an auxiliary light projecting means, such as a stroboscope, for projecting an auxiliary light to an object to be photographed, first switch means for activating the auxiliary light projecting means, an output means for generating a timing signal in response to activation of the first switch means, and a charging circuit for charging the auxiliary light projecting means so that it may project the light in accordance with the outputs of the output means and the brightness deciding means. By this construction, the auxiliary light can be automatically projected according to the ambient brightness with a construction which can achieve a lower cost, a lower current consumption and a smaller size than the prior art.

Preferably, the output means includes means for inhibiting charging of the auxiliary light projecting means by the charging circuit when a second switch means, such as a shutter release switch, is not operated for a predetermined period of time after the first switch means has been activated. This makes it possible to avoid unnecessary charging of the auxiliary light projecting means when the photographer has decided not to take a picture, and thereby reduce unnecessary power consumption.

The first and second switch means may be combined together in the second switch means. In that case, operation of the second switch means before the film is advanced results in the performance of functions similar to those in the case in which the first switch means is activated so that photography accompanied by automatic auxiliary light projection can be realized merely by the action of the second switch means to thereby to improve the usability and convenience of the camera.

A photometric circuit according to the present invention comprises a first oscillator, a first counting circuit for counting an output of the first oscillator, a second oscillator having an oscillation frequency which varies according to an ambient brightness, a second counting circuit for counting an output of the second oscillator, and a brightness deciding circuit for judging the ambient brightness in accordance with outputs of the first and second counting circuits.

Preferably, the brightness deciding circuit judges the ambient brightness on the basis of a phase difference between the outputs of the first and second counting means. The first and second oscillators, first and second counting circuits and brightness deciding means are preferably formed in a single integrated circuit chip by CMOS (Complementary Metal Oxide Semiconductor) processing techniques, and the first and second oscillators are symmetric in their circuitry.

DETAILED DESCRIPTION OF THE PREFERRED EMBODIMENTS

Various preferred embodiments of the photometric circuit according to the present invention will be described hereinafter, along with a description of a low-end camera incorporating the inventive photometric circuit. However, as will be appreciated by those of ordinary skill in the art, the inventive photometric circuit may be used in any type of camera and is not limited in application to a low-end camera. The inventive photometric circuit may also be used in devices other than cameras.

Figure 4:
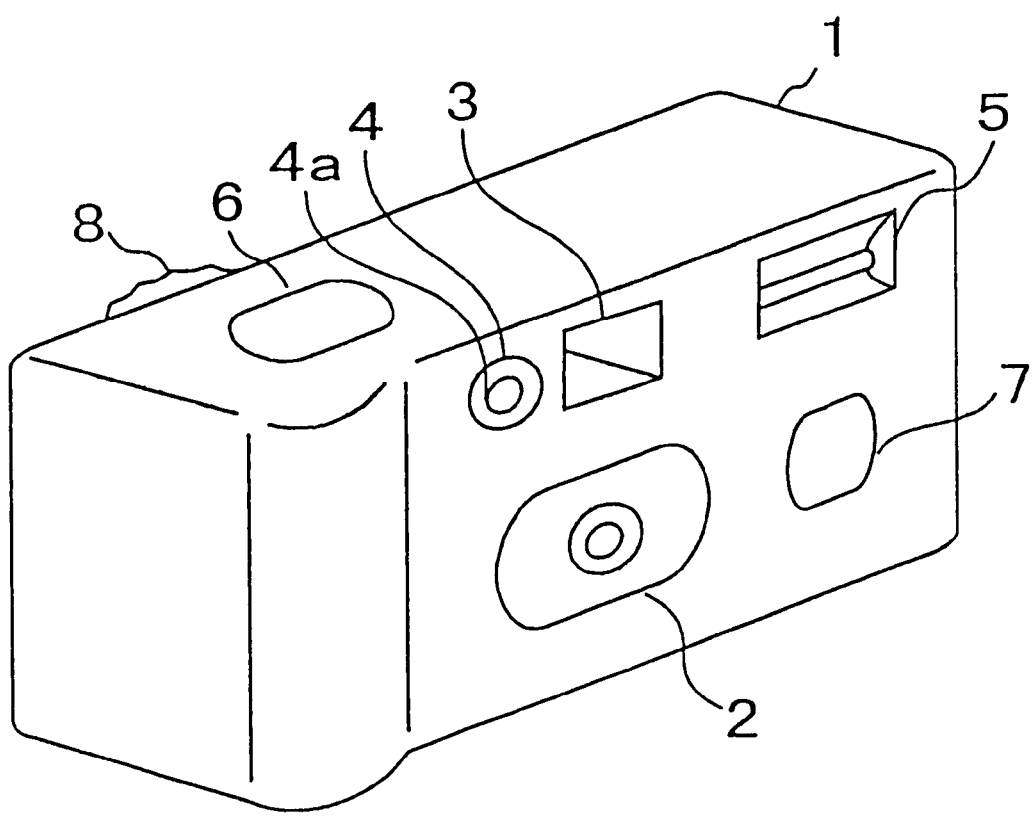
FIG. 4 is an elevational view showing the external appearance of a low-end camera according to the present invention.

Referring to FIG. 4, there is shown a low-end camera incorporating the inventive photometric device. The camera has a body 1 formed of plastic. The camera has a fixed-focus lens 2, which is also formed of a plastic, and which has a focal length set to focus best on an object at a distance of about 3 m. The camera is provided with a plain viewfinder 3 used to compose a photograph. A photometric aperture 4 has a Cadmium Sulfide cell ("CdS") 32 (FIG. 1) disposed behind a transparent plastic cover. The CdS 32 can detect brightness of an object to be photographed. The quantity of light allowed to pass through the photometric aperture 4 onto the CdS 32 is adjusted by a diaphragm 4a. An auxiliary light projecting means comprising a stroboscope 5 projects an auxiliary light to illuminate the object. Second switch means comprising a shutter release switch 6 is used to expose film inside the camera by opening/closing a shutter. First switch means comprising an automatic light emitting switch 7 is a switch for enabling/disabling, each time it is pushed, light emission by the stroboscope 5 in accordance with the ambient luminance. Thus, for example, pressing the automatic light emitting switch 7 enables/disables operation of the auxiliary light projecting means. However, whether or not the stroboscope 5 will be operated is determined by the photometric circuit to be described below.

Figure 3:
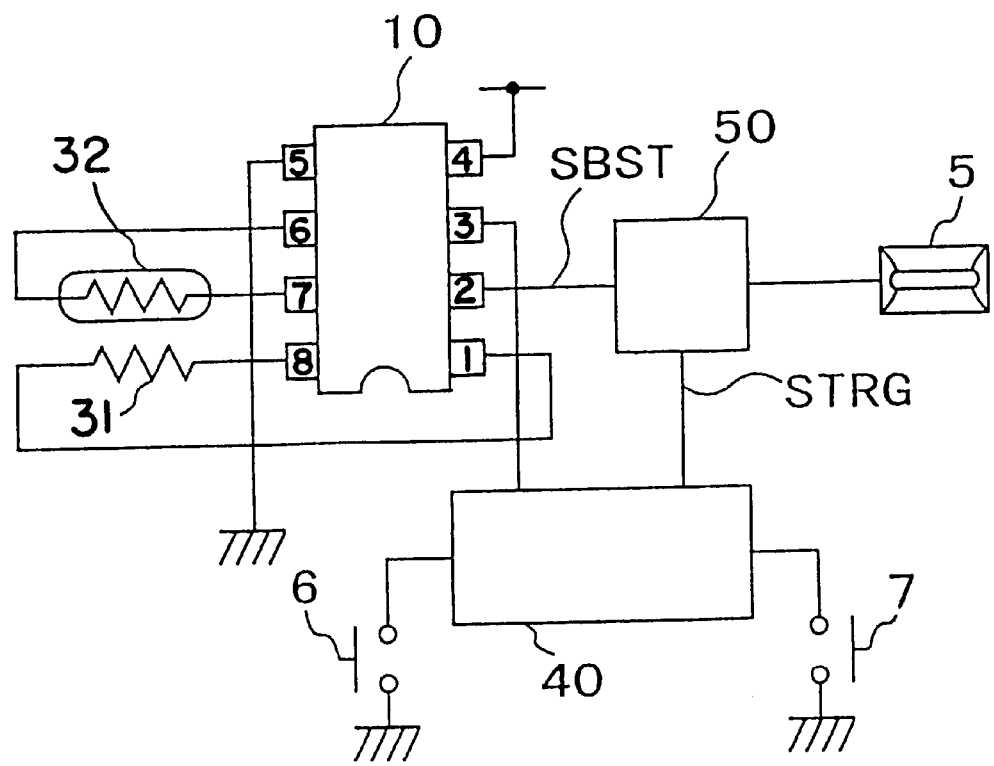
FIG. 3 is a circuit block diagram of the internal circuitry of a low-end camera incorporating the photometric IC of FIG. 2 in accordance with the present invention.

A block diagram of the internal circuitry of the above-described low-end camera is illustrated in FIG. 3. A photometric IC (Integrated Circuit) 10 is an IC comprising the nucleus of the photometric device of the invention. To this, there are externally attached the CdS 32 for metering an object brightness and a reference resistor 31. Output means comprising a timing circuit 40 generates a timing output signal for controlling the photometric IC 10 when the automatic light emitting switch 7 is pushed. Alternatively, the automatic light emitting switch 7 and the shutter release switch 6 may be combined so that the timing circuit 40 generates the timing output signal when the shutter release switch 6 is pushed. A stroboscope charging circuit 50, which will be described below, is also connected to the photometric IC 10. The stroboscope charging circuit 50 has a high capacitance value capacitor packaged therein for flashing the stroboscope 5.

The stroboscope charging circuit 50 is responsive to the photometric IC 10 depending upon ambient light and does not charge the internal capacitor to flash the stroboscope when a signal BENBL at an output terminal (pin 2) of the photometric IC 10 is at a low level ("L"). When the BENBL signal is at a high level ("H"), however, the stroboscope charging circuit 50 charges the capacitor to thereby cause the stroboscope 5 to flash in response to a signal ("STRG") output by the timing circuit 40 at a timing set in accordance with the operation of the release switch 6.

Figure 2:
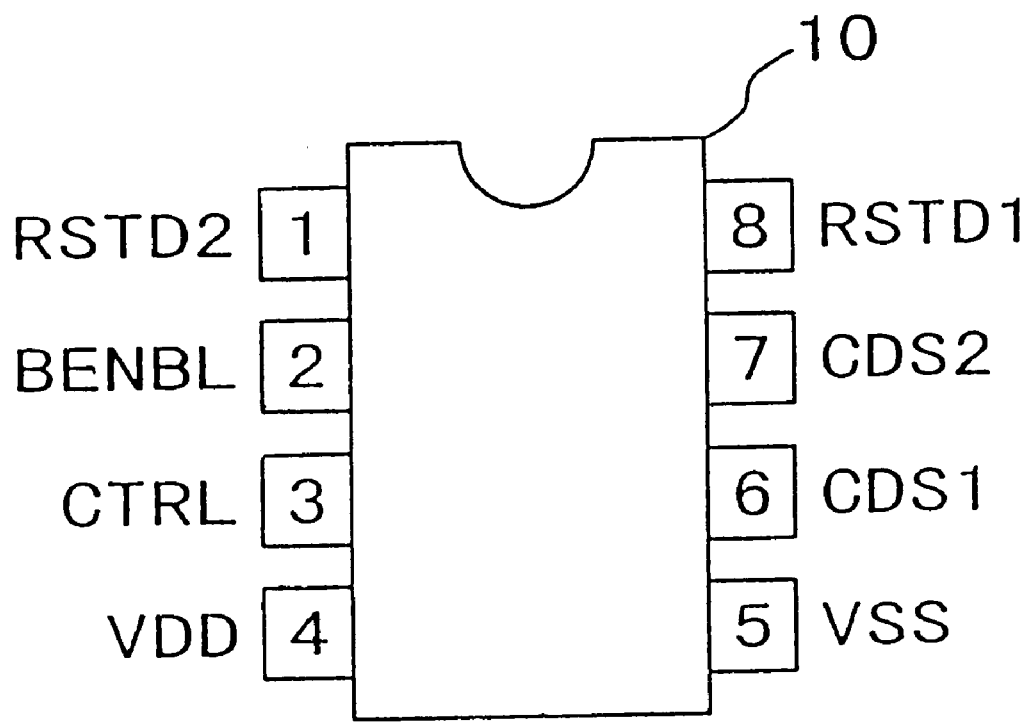
FIG. 2 is an explanatory diagram showing the pin layout of a photometric IC according to the embodiments of the present invention.

The photometric IC 10 will now be described. The pin layout of the photometric IC 10 is shown in FIG. 2. The CdS 32 is connected between the sixth pin ("CDS1") and the seventh pin ("CDS2") of the photometric IC 10, and the reference resistor 31 is connected between the eighth pin ("RSTD1") and the first pin ("RSTD2") thereof. From the second pin ("BENBL") of the photometric IC 10, a signal is output to the stroboscope charging circuit 50 for charging the stroboscope. A control signal for starting or stopping the action of the photometric IC 10 is input to the third pin ("CTRL") of the photometric IC 10. Power is supplied to the fourth pin ("VDD") and the fifth pin ("VSS") of the photometric IC 10. The VDD terminal at the fourth pin is a high voltage input whereas the VSS terminal at the fifth pin is a low voltage input.

Figure 1:
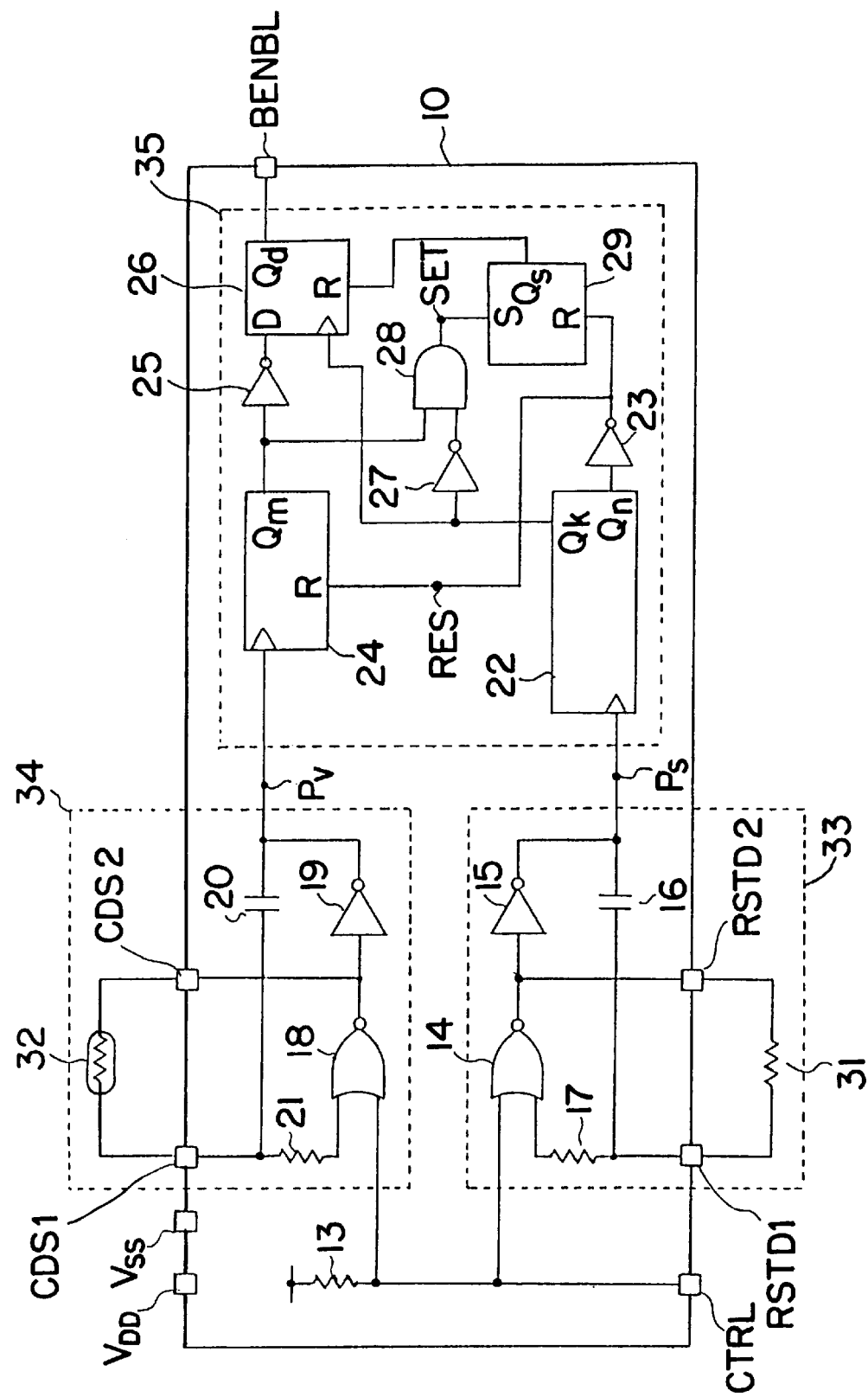
FIG. 1 is a circuit schematic diagram of a photometric IC in accordance with a first embodiment of the present invention.

A first embodiment of the internal circuit of the photometric IC 10 is shown in FIG. 1. The CTRL terminal input (pin 3) is usually kept "H" by a pull-up resistor 13 so that the outputs of NOR gates 14 and 18 remain "L". When the CTRL terminal input is "L", the NOR gates 14 and 18 are opened to start a photometric operation.

The NOR gate 14, an inverter 15, a capacitor 16 and a resistor 17 comprise a first oscillator 33 together with the reference resistor 31 which is externally connected between the RSTD1 terminal and the RSTD2 terminal (pins 1 and 8) of the photometric IC 10. The first oscillator 33 continuously outputs to a terminal Ps square waves at a specific frequency and duty ratio, which are determined according to the electrical characteristics and temperature characteristics of the individual elements.

Likewise, the NOR gate 18, an inverter 19, a capacitor 20 and a resistor 21 comprise a second oscillator 34 which uses the CdS 32 externally connected between the CDS1 terminal and the CDS2 terminal (pins 6 and 7) of the photometric IC 10 as an oscillation frequency determining element, and continuously outputs to a terminal Pv square waves at a given frequency and duty ratio, which are also determined according to the electrical characteristics and temperature characteristics of the individual elements. The optimum resistance value of the reference resistor 31 is selected during the manufacture of the photometric IC 10 according to the characteristics of the CdS 32. In this embodiment, the capacitor 16 and the capacitor 20 can be packaged in the photometric IC 10 because their capacities are at about 30 picofarads at most.

The quantity of light permitted to impinge upon the CdS 32 may be varied by the diaphragm 4a shown in FIG. 4. Therefore, a variable resistor, as required in the prior art for establishing a proper resistance range of the CdS 32 in a predetermined brightness range, can be eliminated to make an electric adjustment unnecessary. When the proper adjustment cannot be achieved by the diaphragm 4a, however, a resistor or the like may be added in series or in parallel to the CdS 32 for adjustment purposes.

First counting means comprising a first counter 22 is an n-bit binary counter which receives the output of the first oscillator 33 as a clock signal and divides it into n stages.

Second counting means comprising a second counter 24 is an m-bit binary counter that is reset with an inverted signal RES of a MSB (Most Significant Bit) signal Qn of the first counter 22, and receives the output of the second oscillator 33 as a clock signal and divides it into m stages.

A D-latch 26 has input at a D terminal thereof an inverted version of the output signal Qm of the second counter 24 and has input as a clock signal the output signal Qk of the first counter 22. The D-latch 26 outputs the resultant signal from the terminal Qd to the BENBL terminal (pin 2) of the photometric IC 10. In this circuit, "k" is smaller by 1 than "n" so that the signal from the terminal Qk is a clock having a frequency double that of the signal from the terminal Qn, that is, divided by one less stage.

Reference numeral 29 designates a set/reset flip-flop ("R/S flip flop") which is set by an output SET of an AND gate 28 having as inputs an inverted version of the signal output from the terminal Qk of the counter 22 and the signal output from the terminal Qm of the counter 24. The set/reset flip-flop 29 is reset by the signal RES comprising an inverted version of the signal output from the terminal Qn of the first counter 22. The D-latch 26 is reset by a Qs output signal of the set/reset flip-flop 29. Reference numerals 23, 25 and 27 denote inverters for producing the inverted signals described above.

The first and second counters 22 and 24, the AND gate 28, the D-latch 26, the inverters 23, 25 and 27 and the R/S flip-flop 29 comprise a brightness deciding circuit 35 (or brightness deciding means).

The entire photometric circuit, except for the CdS 32 and the reference resistor 31, is formed in a single chip by CMOS processing techniques so that it can operate at a voltage as low as 1V or less. As noted above, when the stroboscope is charged with a 1.5V dry cell, the power supply voltage may temporarily drop to between about 1V and 1.2V. However, the photometric IC 10 can be operated without any problem at 1V. As a result, the circuit can be reliably operated even when it is incorporated into a low-end camera using a low voltage, low capacity power supply such as a single dry cell (of about 1.5V).

Figure 5:
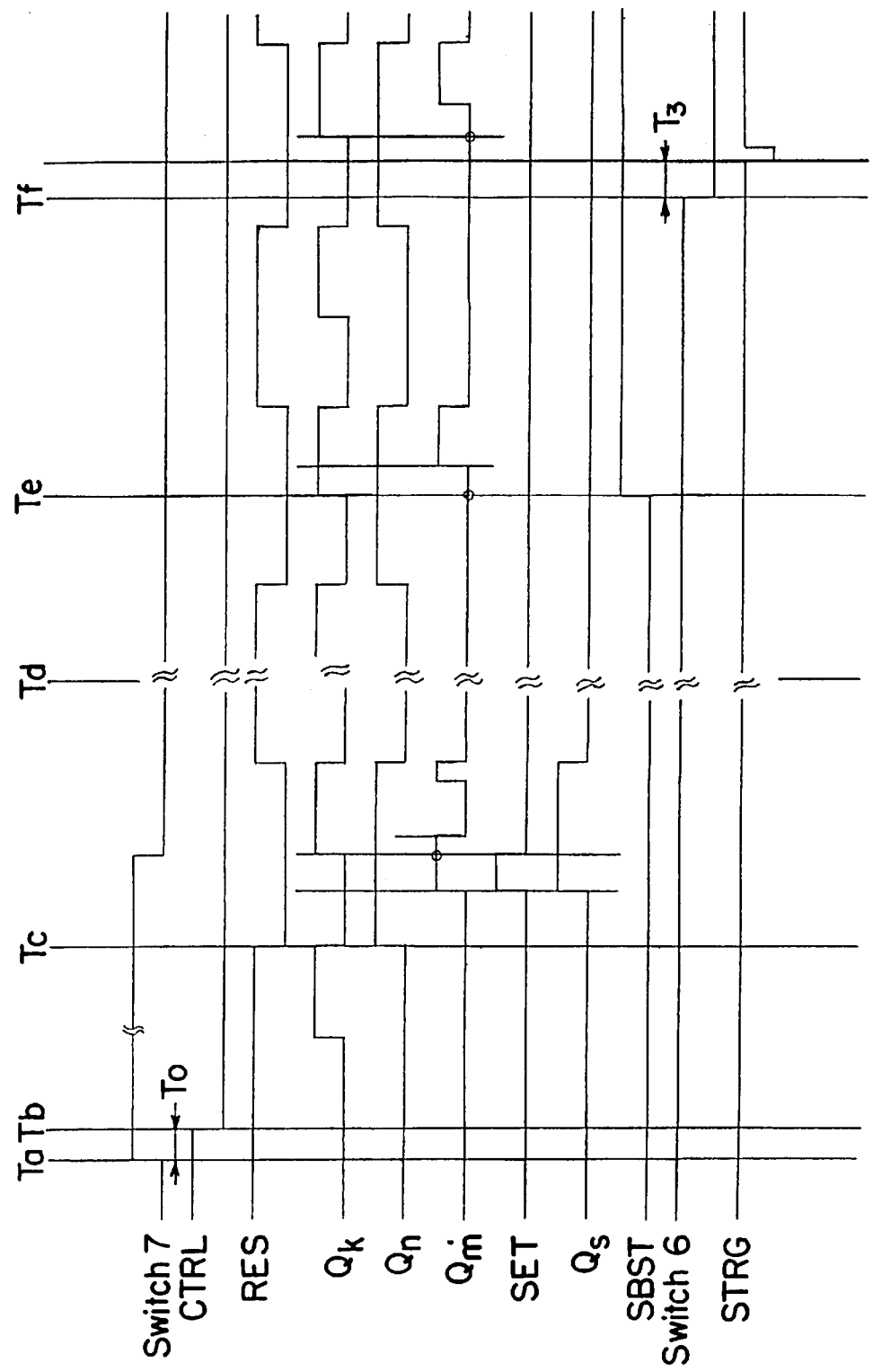
FIG. 5 is a timing diagram used for explaining the operation of the photometric IC of the first embodiment of the present invention.

Next, the operation of FIG. 3 will be described with reference to the timing chart of FIG. 5. In FIG. 5, signals denoted by the designations "Switch 6" and "Switch 7" indicate the states of the switches 6 and 7, respectively. Signals denoted by CTRL to Qd indicate the voltage levels of the terminals CTRL to Qd of FIG. 1, and STRG denotes the state of the STRG signal shown in FIG. 3.

When the automatic light emitting switch 7 is pushed (at time Ta), the timing circuit 40 toggles the CTRL terminal (pin 3) to "L" (at time Tb) with a delay of time T0 so as to eliminate the chattering of the mechanical pushbutton switch used as the automatic light emitting switch 7. When the CTRL terminal becomes "L", the NOR gates 14 and 18 are opened, as described above, so that the first and second oscillators 33 and 34 start oscillating. The first counter 22 counts the sequential pulses output by the first oscillator 33, and, when the count value reaches a predetermined amount, the voltage level at the output terminal Qk changes, followed by a change at the output terminal Qn, as shown in FIG. 5.

The second counter 24 is reset when the terminal Qn of the first counter 22 is at "L". However, the second counter 24 is also disabled and does not count the output of the second oscillator 34 when the Qn is "L". When the count value of the first counter 22 advances so that the voltage level at the output terminal Qn becomes "H" (at time Tc), the second counter 24 is released from its reset state to start the counting the output of the second oscillator 34.

In FIG. 5, the period of time Tc to Td illustrates a state in which there is a bright ambient light. In this state, the CdS 32 has a low resistance, and the second oscillator 34 has a high oscillation frequency. In the "H" state of the terminal Qn of the first counter 22, therefore, the counting period of the second counter 24 is relatively short and a "H" level appears at the output terminal Qm of the second counter 24 in a relatively short period of time.

On the other hand, the output of the first oscillator 33 does not change with the brightness of the environment but maintains at a substantially constant value so that the time at an "H" output pulse voltage appears at the output terminal Qk of the first counter 22 does not fluctuate.

In the case of a brightly lit background or bright environment in FIG. 5 (Tb to Td), therefore, the voltage level at the output terminal Qm of the second counter 24 becomes "H" before the rise of the signal that is output at the output terminal Qk of the first counter 22. Thus, the output Qd of the D-latch 26 becomes "L". As a result, the BENBL terminal (pin 2) is kept at "L", and the capacitor of the stroboscope charging circuit 50 is not charged.

Figure 6:
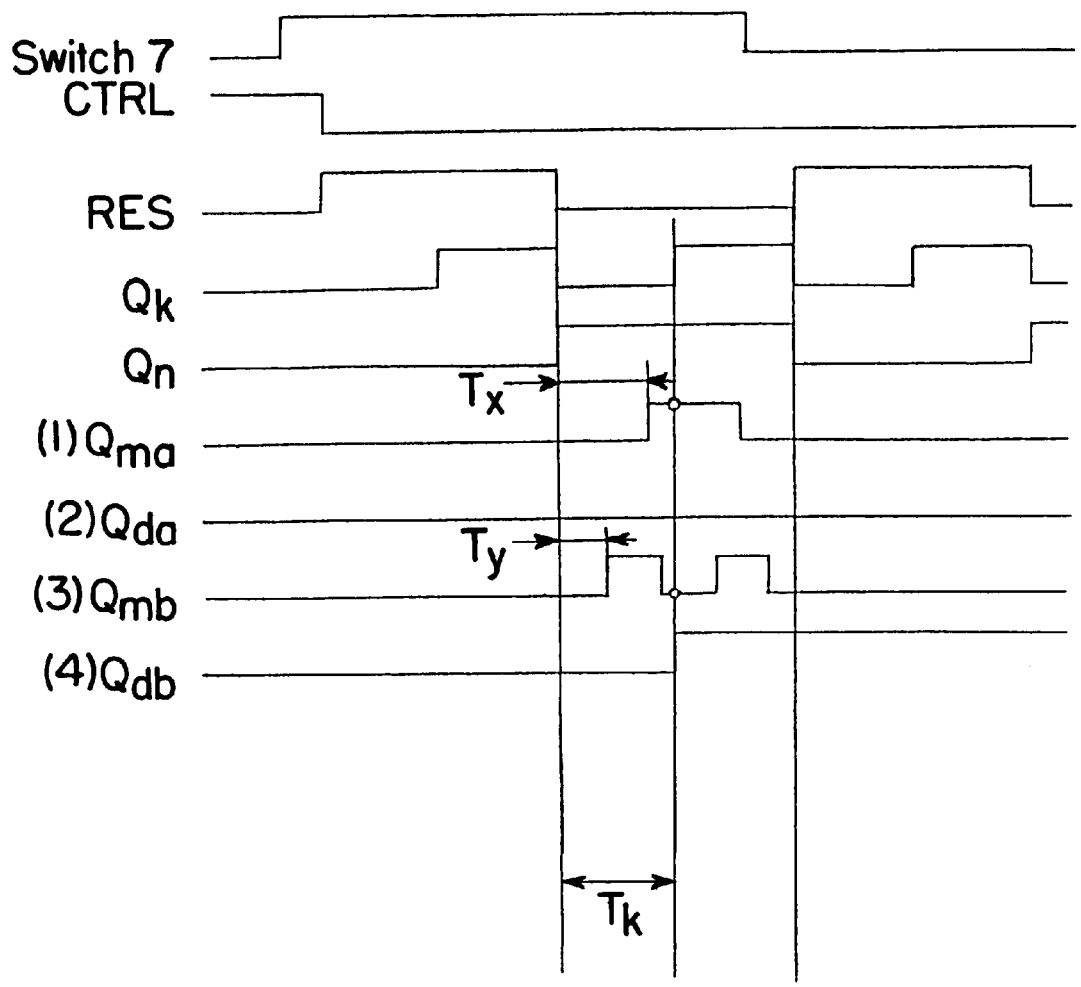
FIG. 6 is a timing diagram used for explaining the operation of the photometric IC of the first embodiment of the present invention.

With reference to FIG. 6, brightness deciding circuit 35 contains circuitry to prevent a malfunction from occurring in response to a high luminance background. In FIG. 6, portions identical to those illustrated in FIG. 5 are designated by the same reference letters.

It will first be described why countermeasures against malfunction in a high luminance background are necessary for the brightness deciding circuit 35.

In FIG. 6, the time period during which the voltage level at the output terminal Qk of the first counter 22 is at a "L" value is designated by Tk, and the time period from the fall of the signal at the output terminal Qk of the first counter 22 to the rise of the output signal generated at the output terminal Qm of the second counter 24 is designated by Tn (n=x, y), for an ambient brightness within a suitable range. In this example, Tk>Tn(=Tx)>0.5 Tk (as shown at (1) and (2) in FIG. 6). Accordingly, the rise of the signal at the output terminal Qk of the first counter 22 occurs when the terminal Qm is in a state "H", as shown by case (1) in FIG. 6. In this case, the D-latch 26 correctly outputs a "L" level signal to prevent operation of the stroboscope charging circuit 50, as described above. (Reference should be made to case (2) of FIG. 6).

As the environment grows brighter so that Tn, the time period from the fall of the signal at the output terminal Qk of the first counter 22 to the rise of the signal at the output terminal Qm of the second counter 24, is decreased to Ty, wherein Ty<0.5 Tk (as shown by cases (3) and (4) in FIG. 6). In this case, however, at the rising time of the signal at the output terminal Qk, the voltage level at the terminal Qm has already become "H" and then returned to "L". If, in this state, the D-latch 26 were activated, there would be a disadvantage in that the charge starting signal would be output to the stroboscope charging circuit 50 in a high luminance state. The circuit comprised of the flip-flop 29, the AND gate 28 and the inverter 27 prevents this occurrence. Operation of the circuit comprising the flip-flop 29, the gate 28 and the inverter 27 will now be described.

As the voltage level on the output terminal Qm of the second counter 24 becomes "H" when the ambient brightness is high so that the voltage level at the output terminal Qk of the first counter 22 is at a "L" level, as shown in FIGS. 1 and 5, the level "H" at the terminal Qm is passed as the SET signal through the AND gate 28 to set the flip-flop 29. When set, this flip-flop 29 resets the D-latch 26 to hold the output of the D-latch 26 at "L".

The flip-flop 29 is not reset until the output terminal Qn of the counter 22 becomes "L" so that the D-latch 26 keeps the output "L"522. As a result, the D-latch 26 keeps the output "L" even if its D-terminal returns to "L" again while the terminal Qn is at "H", so that the above-described malfunction due to high luminance is prevented.

When the output terminal Qn of the first counter 22 becomes "L", the D-latch 26 is released from its reset state. At this time, however, the second counter 24 is reset to turn the terminal Qn to "H" so that a malfunction due to high luminance does not occur.

As will be appreciated by those of ordinary skill in the art, the malfunction preventing circuitry for preventing erroneous operation of the stroboscope in high luminance is not limited in any way to the aforementioned circuitry and can be achieved in various different manners. For example, another embodiment of the photometric circuit 10 having different malfunction preventing circuitry is shown in FIGS. 7 and 8.

Figure 7:
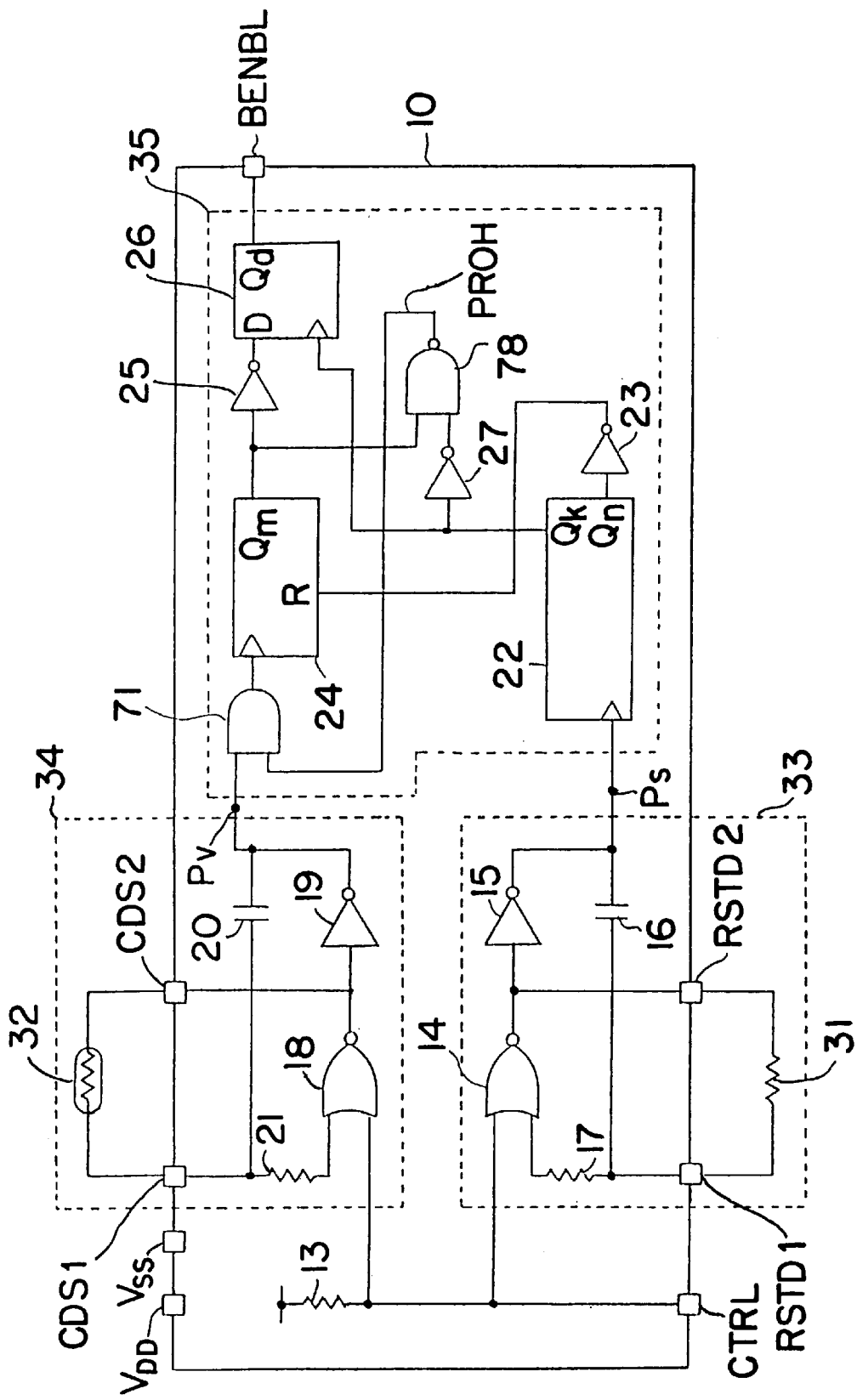
FIG. 7 is a circuit schematic diagram of a photometric IC in accordance with a second embodiment of the present invention.
Figure 8:
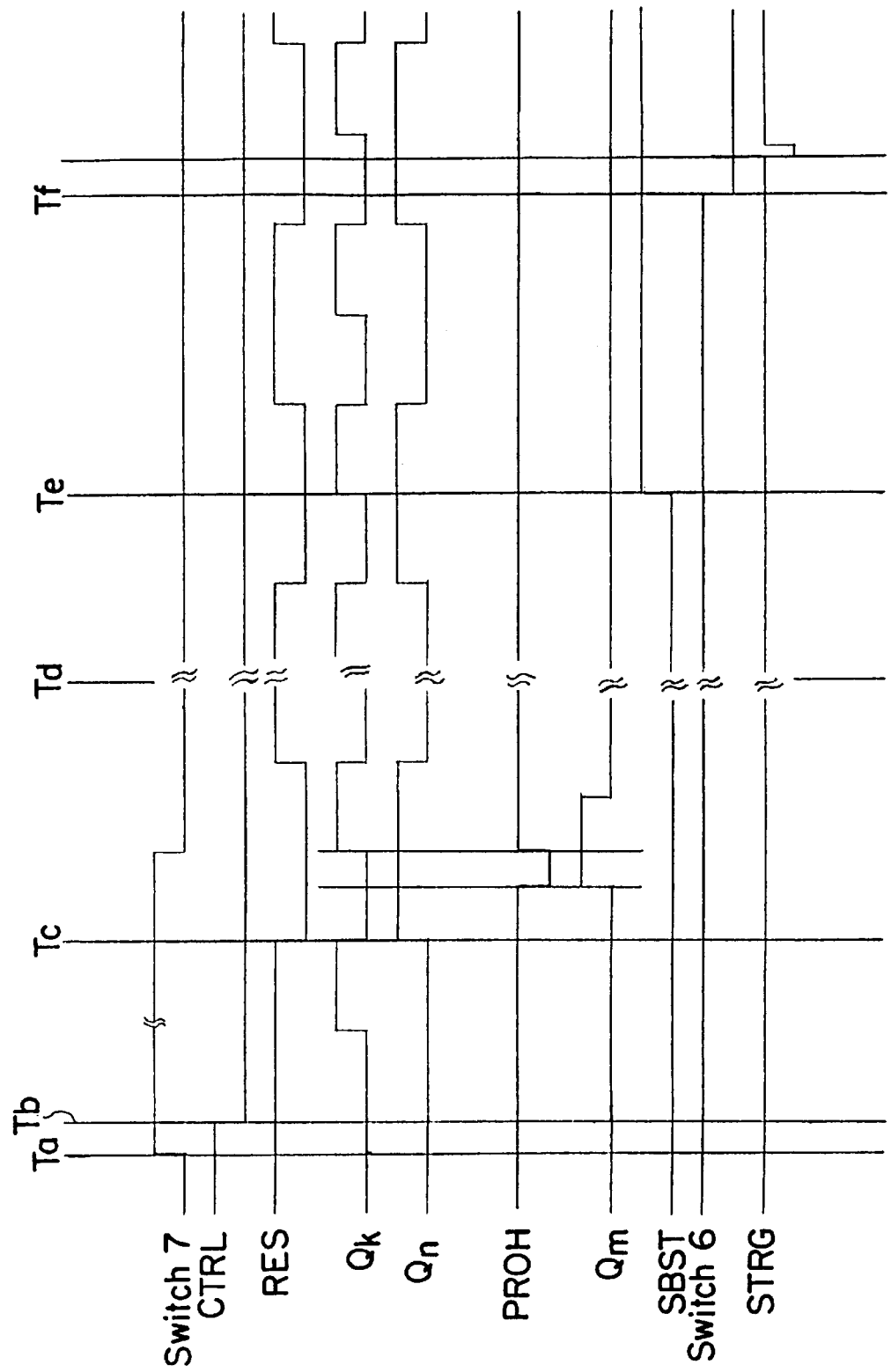
FIG. 8 is a timing diagram used for explaining the operation of the photometric IC of the second embodiment of the present invention.

FIG. 7 illustrates a photometric circuit 10 according to a second embodiment of the present invention. FIG. 8 is a timing diagram used to explain the operation thereof. Components and elements in FIGS. 7 and 8 which are identical to those illustrated in FIGS. 1, 5 and 6 are designated by the same reference numerals, and a redundant detailed description thereof is omitted. As can be seen, the photometric circuit 10 of FIG. 7 omits the R/S flip flop 29 and the AND gate 28 used in FIG. 1. In FIG. 7, reference numeral 71 designates an AND gate, and numeral 78 designates a NAND gate. In FIG. 8, PROH designates an output of the NAND gate 78.

The signal PROH is equivalent to an inverted version of the signal SET in the FIGS. 1, 5 and 6 embodiment. The output signal PROH and the output signal of the second oscillator are input to an AND gate 71, the output of which is supplied as a clock signal to the second counter 24. Input to the second counter 24 is inhibited when the PROH signal is "L" so that the output of the second oscillator 34 is not counted when PROH is "L".

Operation of the circuit to prevent malfunction in a high luminance state will be briefly described. When the voltage level at the output terminal Qm of the second counter 24 becomes "H" before the voltage level a the output terminal Qk of the first counter 22 becomes "H", the signal PROH output by the NAND gate 78 is at a "L" level to close the AND gate 71 and to thereby shut the input to the second counter 24.

As a result, the terminal Qm of the counter 24 is kept at a "H" level. When the terminal Qk of the first counter 22 becomes "H" in this state, the D-latch 26 is triggered by the rise to latch the inverted output "L" of the terminal Qm and to keep the output "L" (as shown in FIG. 8).

As will be appreciated by those of ordinary skill in the art, the above-described protective circuit can be eliminated if inadvertent activation of the stroboscope is prevented in another manner, for instance, by adjusting the values of the individual elements of the first and second oscillators or by another method (e.g., by arranging a filter in front of the photometric element).

Referring again to the timing diagram of FIG. 5, it is assumed that the ambient brightness drops around the time Td. This may occur as a result of numerous actions, such as movement of the camera to a dark or dimly lit background, such as indoors, by approaching the camera to an object to be photographed, or, for example, by means of the photographer's hand improperly gripping the camera.

Since the resistance of the CdS 32 increases when the ambient illumination decreases, the oscillation frequency of the second oscillator becomes low to increase the amount of time before the voltage level at the output terminal Qm of the second counter 24 changes to "H". As a result, when the voltage level at the output terminal Qk of the first counter 22 rises, the terminal Qm of the counter 24 remains at "L", and the output of the D-latch 26 becomes "H". Thus, the voltage level at the BENBL terminal becomes "H", and the charge starting signal SBST (at "H") is output from the BENBL terminal so that the charge of the capacitor of the stroboscope charging circuit 50 is commenced.

When the photographer advances the film by one frame with a film advancing dial 8 and pushes the release switch 6 at time Tf, the timing circuit 40 outputs the stroboscope trigger STRG to the stroboscope charging circuit 50 with a delay of time period T3 for maximizing the aperture from the fall of the release switch 6, to thereby flash the stroboscope 5.

The charge starting signal is outputted, as is apparent from FIG. 5, even if the environment becomes dark so that the resistance value of the CdS 32 increases and the level of the signal Qm does not rise.

The same result could be obtained even if the inverter 25 is eliminated from the circuit of FIG. 1 by connecting the terminal Qs with the D-terminal of the D-latch 26 and by connecting the terminal Qk with the clock terminal of the D-latch 26.

Figure 9:
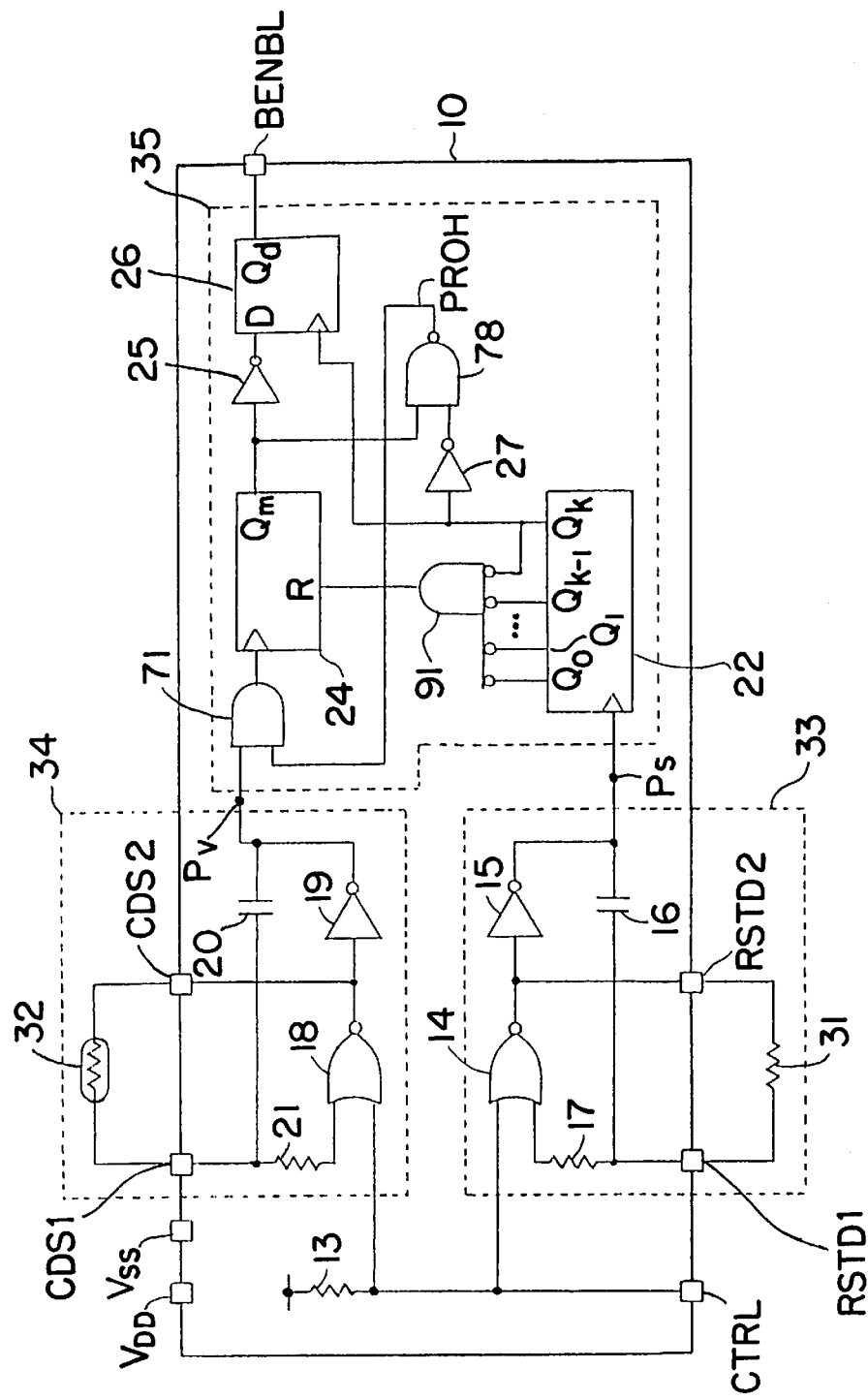
FIG. 9 is a circuit schematic diagram of a photometric IC in accordance with a third embodiment of the present invention.
Figure 10:
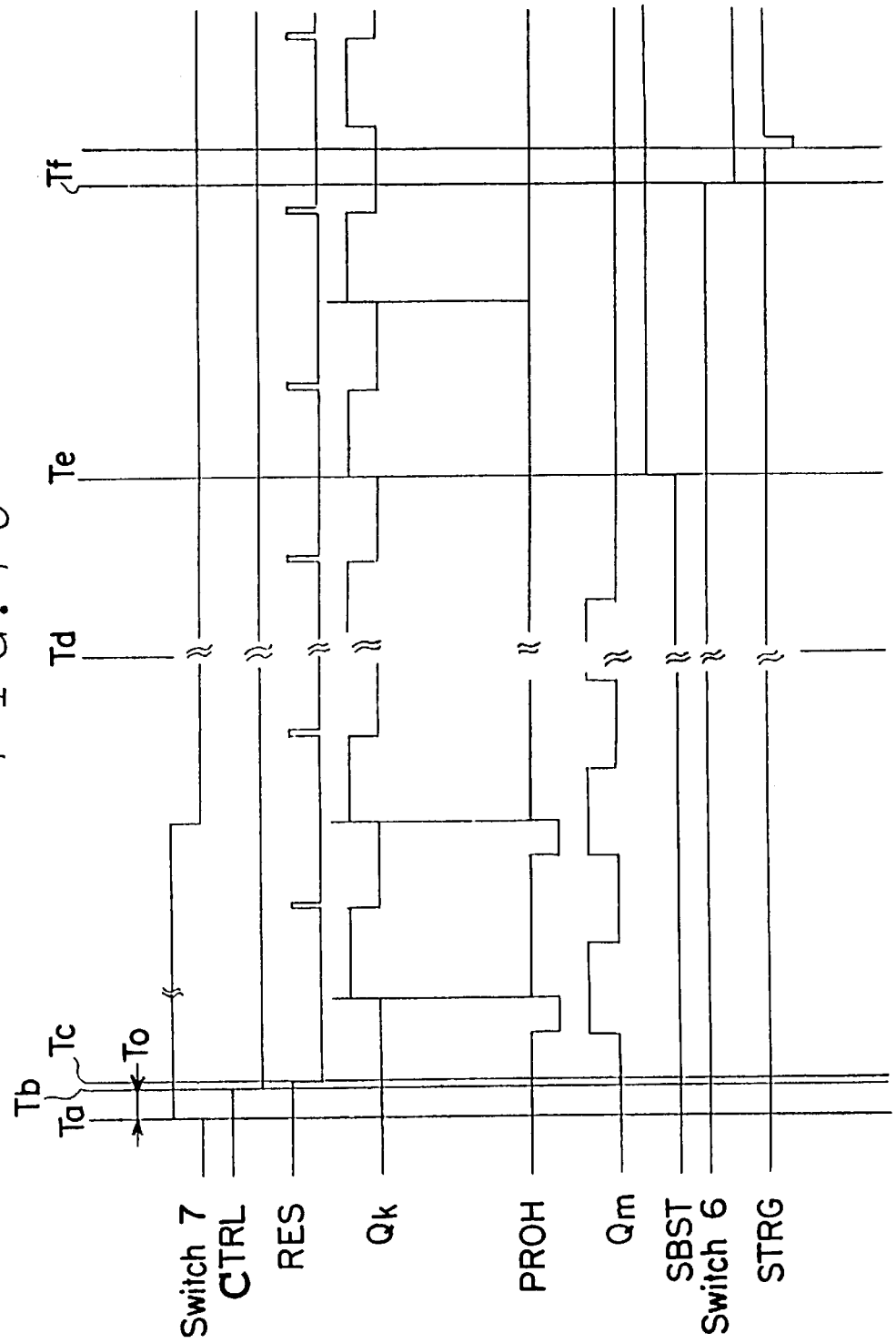
FIG. 10 is a timing diagram used for explaining the operation of the photometric IC of the third embodiment of the present invention.

A third embodiment of the photometric circuit will be described with reference to FIGS. 9 and 10. In FIG. 9, reference numeral 91 designates a negative input AND gate. In FIGS. 9 and 10, elements identical to those shown in FIGS. 7 and 8 are designated by the same reference numerals.

The negative input AND gate 91 takes the logical AND of inverted versions of all the outputs of the first counter 22 so that it resets the counter 24 periodically each time the terminal Qk becomes "L". The second counter 24 starts its counting operation, after reset, to set the terminal Qm to "H" while the terminal Qk is at "L", in the case of the bright environment, as described above. In this case, the brightness can be judged without depending on the output of the terminal Qn of the first counter 22 so that the judgement interval for the brightness can be made shorter than that of the first and second embodiments.

Another reason why the ambient luminance may be lowered at or after time Td may not be a result of movement of the camera to a dimly lit environment, but, in fact, from placing the camera into a case, bag or pocket. In that event, the result is that charging of the stroboscope 5 is unnecessarily continued although no photograph will be taken. In order to avoid this, the timing circuit 40 acts to turn OFF the CTRL terminal forcibly when the release switch 6 has not been pushed within a predetermined time period (e.g., 3 minutes) in the dark. This makes it possible to avoid needless power consumption. In this case, the same series of operations described above is performed if the photographer operates the automatic light emitting switch 7 again.

Unless the automatic light emitting switch 7 is pushed, the capacitor of the stroboscope charging circuit 50 is not charged. When the ambient brightness is apparently sufficient, therefore, the photography can be continued without pushing the automatic light emitting switch 7.

Although the invention has been described in terms of various preferred embodiments, those skilled in the art will recognize that various modifications of the invention can be practiced within the spirit and scope of the appended claims.

Thus, for instance, while the above-described embodiments have been described on the basis in which the photometric device of the invention is incorporated into a low-end camera, the same circuit may be used in any type of camera, including more expensive cameras. Moreover, the photometric circuit of the present invention may be applied to any type of device in which ambient light is monitored and is not of limited applicability to a camera.

Although the automatic light emitting switch 7 and the release switch 6 are separately arranged, the same effect can be realized by use of only one switch if activation of the release switch 6 before the film is advanced by the film feed dial 8 is made to perform an action similar to that of the automatic light emitting switch 7.

Depending upon the circuit construction of the oscillator, on the other hand, one end of the reference resistor 31 and the CdS 32 could be connected with the VDD terminal or the VSS terminal. In this case, the photometric IC 10 may have six pins and can be made smaller.

Although a release button is used in the illustrative embodiments as the trigger for stroboscope light emission, the switch can be replaced by a member which moves as the shutter member is opened and closed, and a sensor can be used for detecting the opening and closing of the shutter member by mechanical or optical means. There may also be provided display means such as an LED or the like for indicating that the automatic light emitting switch 7 has been pushed to operate the photometric IC 10.

Since the first and second oscillators are made symmetric in their circuitry, changes in the ambient temperature and voltage fluctuation are offset to stabilize the operations and to make it unnecessary to add a circuit for temperature and/or supply voltage compensation. This effect is enhanced by forming the circuitry in an integrated circuit. Moreover, since the output of the oscillators is divided in frequency by the counters, the capacitor for determining the time constant can advantageously be reduced in capacity and packaged in the integrated circuit.

As described above, in accordance with the present invention, a photometric circuit can be produced which does not require either a microcomputer or a comparator, and the size, cost and current consumption of the photometric circuit is reduced, as compared to the prior art. The ambient brightness is judged not according to the outputs of individual oscillators, but according to outputs of individual counting means which count successive pulses output by the individual oscillators. Accordingly, even if the above-described second oscillator undergoes only slight change in oscillation frequency in response to the ambient brightness, the slight change can be easily detected since it results in an accumulated count value in the counting circuit so that the ambient brightness can be reliably judged according to the accumulated count value. This makes it unnecessary to use costly, high-precision components in the second oscillator to achieve a photometric circuit having excellent response.

The first and second oscillators, the first and second counting means and the brightness deciding means are formed in a single IC using CMOS processing techniques so that they can act at a voltage as low as 1V or less. If the invention is applied to the low-end camera or the like, therefore, it can be reliably operated even by a power supply of low voltage and capacity such as a single dry cell (at about 1.5 V). Such a camera comprises auxiliary light projecting means for projecting an auxiliary light to an object to be photographed, first switch means for activating the auxiliary light projecting means, output means for generating a timing signal in response to activation of the first switch means, and a charging circuit for charging the auxiliary light projecting means so that it may project the light in accordance with the outputs of the output means and the brightness deciding means. By this construction, a low end camera can be provided with auxiliary light projecting means which can be operated automatically according to the ambient brightness by a low cost construction, with a lower current consumption and a smaller space than the prior art.

In order to save additional power, the output means inhibits the charging operation when a second switch means, such as a shutter release switch, is not activated for a predetermined of time after the first switch means has been activated. This makes it possible to avoid the continued charging of the auxiliary light projecting means when no photograph will be taken.

By action of the second switch means before the film is advanced, actions similar to those of the case in which the first switch means is activated are executed so that the photography accompanied by automatic auxiliary light projection can be realized merely by the action of the second switch means thereby to improve the operability.

We claim:

1. A photometric circuit comprising: a first oscillator; first counting means for counting an output of the first oscillator; a second oscillator having an oscillation frequency which varies in accordance with ambient brightness; second counting means for counting an output of the second oscillator; and brightness deciding means for judging the ambient brightness in accordance with the outputs of the first and second counting means.

2. A photometric circuit according to claim 1; wherein the outputs of the first and second oscillators comprise periodic signals having successive pulses and the first and second counting means count the successive pulses.

3. A photometric circuit according to claim 2; further comprising a logic circuit responsive to count values of the first and second counting means for producing an output signal used for activating a charging circuit for charging a stroboscope when a count value of the second counting means indicates a low ambient light condition.

4. A photometric circuit according to claim 2; further comprising light projecting means for projecting a light; a charging circuit for charging the light projecting means; and a logic circuit responsive to count values of the first and second counting means for producing an output signal when a count value of the second counting means indicates a low ambient light condition; wherein the output signal of the logic circuit is input to the charging circuit to control charging of the light projecting means.

5. A photometric circuit according to claim 1; wherein the second oscillator comprises an oscillator circuit having a light detecting element which has electrical characteristics that vary depending upon ambient light, so that the oscillation frequency of the second oscillator depends upon the ambient light.

6. A photometric circuit according to claim 1; wherein the brightness deciding means includes means for judging the ambient brightness on the basis of a phase difference between outputs of the first and second counting means.

7. A photometric circuit according to claim 1; wherein the first and second oscillators, the first and second counting means and the brightness deciding means are formed in a single CMOS integrated circuit chip.

8. A photometric circuit according to claim 1; wherein the first and second oscillators are formed symmetrically to offset deviations due to temperature and power supply fluctuations.

9. In a camera having auxiliary light projecting means for projecting an auxiliary light to an object to be photographed, first switch means for activating the auxiliary light projecting means, output means for generating a timing signal in response to activation of the first switch means, and a charging circuit for charging the auxiliary light projecting means so that it may project the light in accordance with outputs of the output means and brightness deciding means: the photometric circuit according to claim 1, wherein an output of the brightness deciding means of the photometric circuit is supplied to the charging circuit.

10. A camera according to claim 9; further comprising second switch means for operating a shutter; and wherein the output means includes means for inhibiting the charging of the auxiliarly light projecting means when the second switch means has not been operated within a predetermined period of time after operation of the first switch means.

11. A camera according to claim 10; wherein the first and second switch means are combined in a single switch.

* * * * *